Dec. 14, 1937.  G. W. CHORMANN ET AL  2,102,305
METHOD OF MAKING ABRASIVE TEETH FOR STONE SAWS
Original Filed Sept. 8, 1933  2 Sheets-Sheet 1
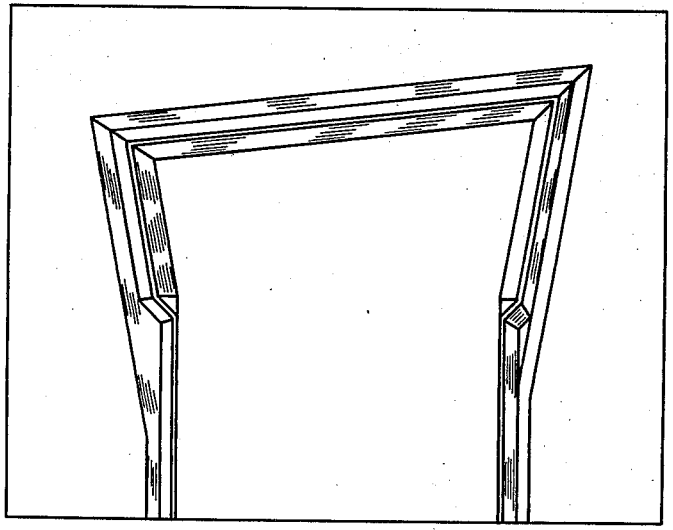
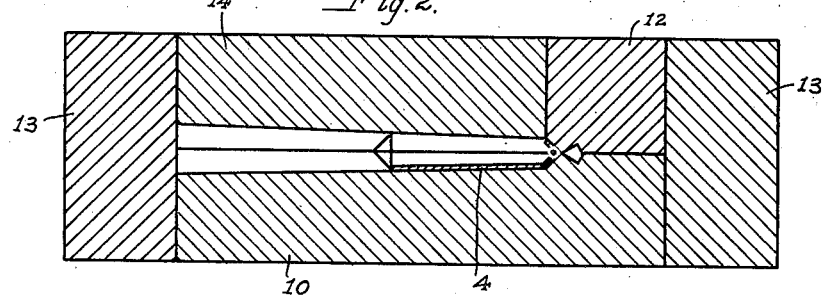
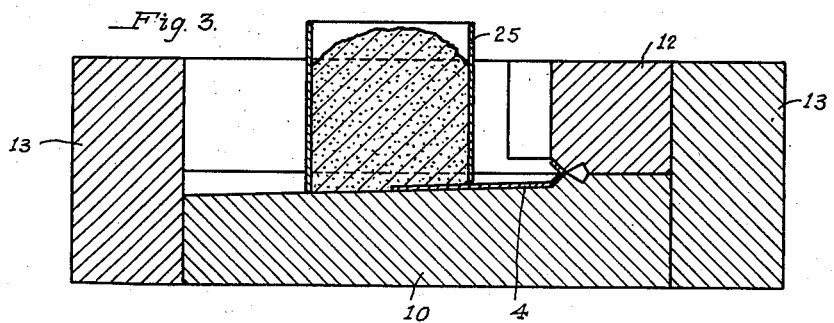
INVENTOR.
GEORGE W. CHORMANN
HARRY J. COWIE
BY
ATTORNEY.

Dec. 14, 1937.      G. W. CHORMANN ET AL      2,102,305
METHOD OF MAKING ABRASIVE TEETH FOR STONE SAWS
Original Filed Sept. 8, 1933      2 Sheets-Sheet 2
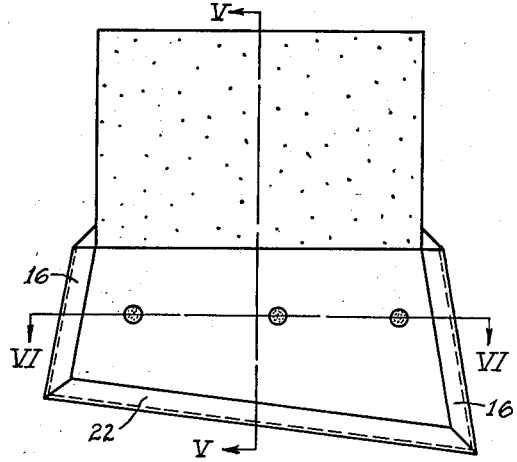
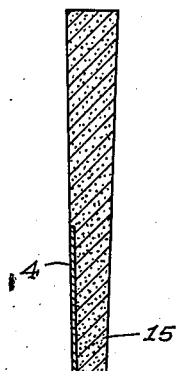
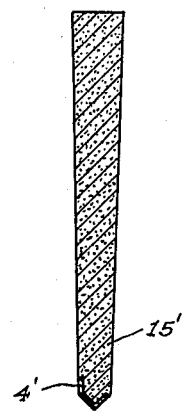
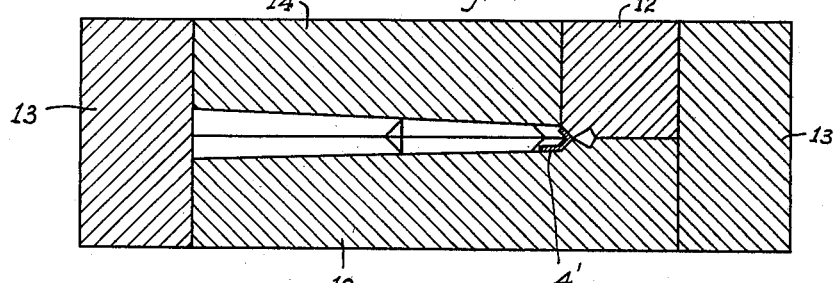
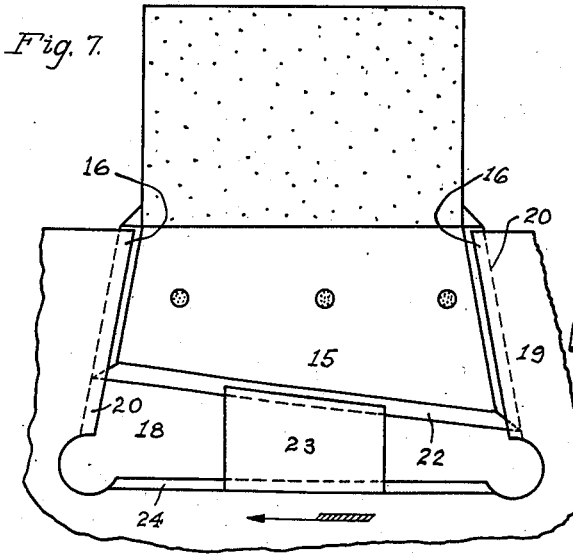
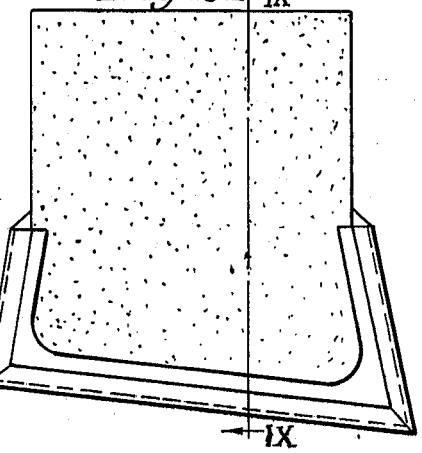
INVENTOR.
GEORGE W. CHORMANN
HARRY J. COWIE
BY
ATTORNEY.

Patented Dec. 14, 1937

2,102,305

UNITED STATES PATENT OFFICE 2,102,305

METHOD OF MAKING ABRASIVE TEETH FOR STONE SAWS

George W. Chormann, Niagara Falls, N. Y., and Harry J. Cowie, Niagara Falls, Ontario, Canada, assignors, by mesne assignments, to The Carborundum Company, Niagara Falls, N. Y., a corporation of Delaware Original application September 8, 1933, Serial No. 688,640. Divided and this application February 1, 1935, Serial No. 4,446. Renewed October 30, 1937. In Canada October 24, 1933

7 Claims. (Cl. 76—112)

This application is a division of our co-pending application, Serial No. 688,640, filed September 8, 1933.

Our invention relates to an improved abrasive tooth for insertion in a stone-cutting saw, and to a process of manufacturing such a tooth.

In making deep cuts in marble, limestone, and the like, it is often possible to speed up the cutting action by using a saw blade in which are inserted teeth formed from a mixture of bonding material and abrasive grain. This saw blade may be mounted for rotation or for reciprocation. In either case, the insert teeth are mounted in the saw blade and wedge sections placed in position. In United States Patent No. 1,198,871 is disclosed a saw tooth composed of bonded abrasive which is adapted to be mounted in such a saw blade.

While such stone saws have for the most part operated entirely satisfactorily, it has been necessary in the production of the saw teeth to guard carefully against inaccuracies in the molding of the socket engaging edges of the roots of the teeth. It is, for example, quite necessary that the bevelled edges be accurate and smooth to fit properly in the sockets in the saw blades. During the molding of the saw tooth, there is a tendency for the excess abrasive material to squeeze out between the meeting edges of the dies or mold halves. As the material being molded is highly abradant, the molds or dies become worn at the edges after a relatively short time. When this happens the socket engaging edges of the root of the tooth are no longer accurate.

In seeking to overcome the above mentioned difficulties, we have discovered that we have at the same time improved the insert tooth itself. From the very nature of a stone saw, it is requisite that the teeth shall be accurately aligned. If one tooth should be so mounted as to be displaced slightly toward one side or the other, this one tooth bears the strain of grinding or cutting in a slightly offset channel. Breaking of the tooth is almost sure to ensue. Our improvement results in a root whose socket engaging edge portions are more accurate than those obtained on the average in commercial production of these teeth.

For a better understanding of our invention we have shown in the accompanying drawings one form of mold or die which may be used in our improved process of manufacture; and have furthermore shown in detail the structure of the improved abrasive saw tooth which is produced by our process. These drawings, which are intended merely to illustrate our invention and not to limit the same, show in Figure 1 a plan view of the bottom die of the mold used for forming the tooth; in Figure 2 a sectional view through a complete mold including the barrel and a metal sheath in place; in Figure 3 a diagrammatic view in elevation indicating the manner in which the abrasive mix is introduced onto the die; in Figure 4 a view in side elevation of a saw tooth; in Figure 5 a sectional view on the line 5—5 of Figure 4; in Figure 6 a sectional view on line 6—6 of Figure 4; in Figure 7 a fragment of the stone saw with an insert tooth mounted in the saw blade; in Figure 8 a view similar to Figure 2 with a modified form of metal sheath; in Figure 9 a view similar to Figure 5 with a modified form of metal sheath; and Figure 10 is a view in side elevation of an abrasive tooth having a metal edge reinforcement or sheath of the type shown in the sectional view in Figure 9.

We produce the accurate socket engaging edges on the root of a tooth by enclosing the edges in a sheath of sheet metal. As the edges of the root are to be bevelled on both faces, the metal sheath may be stamped in a die to provide the bevelled edges on one side, the corners may then be notched and the extending edges bent back so as to provide V shaped channels on three sides of the sheath. This sheath is then introduced into a recess in a flat die 10. Preferably the sheath is somewhat spread; so that when placed in the recess, it does not quite fit, for a reason which will later be explained.

During the early part of our efforts to produce an improved tooth, we used a second die complemental to die 10; and compacted an abrasive member between the two dies, moulding the abrasive mix into the sheath during the pressing operation. High pressure, for instance a pressure of 2000 lbs. per square inch, may advantageously be used in pressing these abrasive teeth; and we found that during molding, there was a tendency for the sheath to be squeezed outward between the edges of the two dies as they approached each other. The result was that a fin was frequently formed on the root of the tooth; and this fin interfered with the accuracy of the fit, which was the object we had in view. This difficulty we have overcome by using a supplemental die 12, such as shown in Figure 2. This supplemental die 12 overlies and confines the V-shaped portion of the sheath during the pressing operation. The weight of the supplemental die 12 together with its friction against the wall of the mold barrel 13 prevents separation of the supplemental die 12 from the die 10 during the pressing operation, and no fin is formed.

In order to introduce the abrasive mix onto die 10 and within the sheath, a funnel-like appliance, termed a can, 25 is placed over the lower die 10 and filled with a weighed amount of the abrasive mix which is to constitute the body and root of the tooth. This assemblage is then placed in an oven and the temperature elevated sufficiently to allow the abrasive mix to flow under pressure into the mold after the can is removed. The assemblage is removed from the oven, the can taken off the die 10, and the third part (14) of the shaping mechanism pressed downward to complete the pressing operation. This third member consists of a die 14 which, together with the supplemental die 12, constitute a mold half which is supplemental to the die or mold half 10. The shaping mechanism may be guided in any suitable manner during the pressing operation. We prefer to guide these parts in a barrel 13 in a manner well understood in the art. The pressing operation causes the plastic mixture of abrasive grains and bond to flow into all parts of the mold cavity and to become united with the sheath. The sheath itself is simultaneously reshaped to make it accurately fit the die. To enable this to be more effectively carried out, the metal sheath itself is preferably so formed and produced that before it is placed on the die 10 the upper edges are slightly spread. This is made possible by the notches or slits in the corners. When the high pressure used for compacting the abrasive mix is applied to the dies, the upper edges of the sheath are forced inwardly so that the root section and particularly the socket engaging edges may be accurately aligned.

The shaped tooth may then be cured in any suitable manner. We prefer to remove the tooth from the mold and heat it sufficiently to set the bond, this bond being a heat-hardenable resin. If the bond is of such thermo-plastic material that it sets or hardens upon cooling, the pressing operation is sufficient to complete the hardening.

In Figures 4, 5, and 6 we have shown in detail an abrasive saw tooth produced in accordance with our invention. As is evident from Figure 5, one side of the root 15 of the tooth is covered by the metal sheath 4. This side face of metal is advantageous in that it extends between the edge portions of the sheath and braces and positions the same in the mold during the molding operation. If desired, the side face can be eliminated from the sheath and the molding procedure carried on in substantially the same manner as when the sheath has a side face. This modified form of metal sheath or metal reinforcement is restricted largely to the edge portions of the root of the tooth and is illustrated particularly in Figures 9 and 10 of the drawings.

The V shape of the edges 16 of the root are evident from Figure 4. These edges are bevelled on both sides, and are adapted to accurately fit the socket 18 in the plate 19, a fragment of which is shown in Figure 7. Grooves 20 along the two sides of the socket 18 engage the bevelled edges of the root 15; and it is obvious that with accurately formed edges 16 the tooth will be accurately positioned in the socket.

The bottom V-shaped edge 22 of the tooth cooperates with a wedge 23. This wedge may be inserted between edge 22 of the root 15 and a rib 24 on the saw blade 19. When the wedge 23 is driven over it holds the root of the tooth in position in the socket 18. To assist in retaining the wedge in position, the grooves of the wedge and the corresponding surfaces of the tooth and rib 24 are knurled in such a direction that it is easier for the wedge to move into closer relation to tooth and blade than it is in the opposite direction.

As the teeth become more and more worn, the leading portion of the side face of the metal sheath becomes worn off. This may slightly loosen the side face of the sheath from the root 15 of the tooth. As a further improvement in such an abrasive saw tooth, we propose to anchor or embed a portion of the sheath in the material of the root of the tooth. The side face portion of the sheath may be slit to a small extent on the upper edge, the points turned inward and then embedded by the molding of the abrasive material within the sheath. We prefer, however, to break and turn inwardly portions of the sheath as indicated in Figures 4 and 6, a convenient tool for this purpose being a center punch. The inwardly bent portions become embedded or anchored in the abrasive material during the molding process.

Since water is used in the stone-cutting process, it is desirable that the metal sheath should be resistant to the action of water, and may be fashioned, for instance, of stainless steel.

The product we obtain has the very considerable advantage that the socket engaging edges are smooth and accurate. The angle of bevel, which is an important feature of the root of the tooth, is true so that correct positioning of a tooth in its socket in the saw blade is ensured. The cost of the product, due to the elimination of the truing up step after molding, is low.

The teeth are less destructive of the sockets and wedges while being inserted and removed from their positions in the blade. At such times, the teeth engage the socket surfaces and the wedges with considerable pressure. With uncovered abrasive material applied against the socket surfaces and the wedges, any relative movement is bound to cause wear of these surfaces. The metal sheath slides on these surfaces with relatively light friction; so that these surfaces have a longer life.

The process has important advantages not only in that an improved product is cheaply produced, but further in that wear and tear on the dies or mold halves is saved. There is no fin formed at the meeting edges of the dies or mold halves and as the abrasive material had in previous practice considerable destructive effect on these edges, and dies are quite expensive, the saving is worth while.

While we have disclosed herein the preferred manner of making a sheathed tooth and have illustrated and described the product which has yielded the best results so far as we are aware, it will be understood that our invention is not limited either to the specific steps of the process nor to the details of the particular product shown, but may be otherwise embodied and practiced within the scope of the folowing claims.

We claim:

1. The method of manufacturing an accurately fitting insert tooth for a stone-cutting saw which comprises shaping a sheath for the root of the tooth from sheet metal, placing the sheath in a die, confining an edge portion of the sheath with a supplemental die, introducing onto the die and sheath a mixture of abrasive grain and bonding material, and pressing the same to accurate shape while simultaneously molding edge portions of the root into the sheath.

2. The method of manufacturing an accurately fitting insert tooth for a stone-cutting saw which comprises shaping a sheath for the root of the tooth from sheet metal, placing the sheath in a die, confining an edge portion of the sheath with a supplemental die, introducing onto the die and sheath a mixture of bonding material and abrasive grain, and simultaneously pressing the abrasive mix and reshaping the sheath to produce a tooth with an accurately shaped root.

3. The method of manufacturing an abrasive tooth adapted for accurate insertion in a stone-saw blade which comprises placing a preformed sheath with a portion thereof registering with chamfered edges of a die and a portion extending from the die at an angle to the first mentioned portion so that the sheath is V-shaped in cross section, confining an extending portion of the sheath with a supplemental die, and compressing an abrasive mix to accurate shape within said die with an edge portion molded into said confined sheath.

4. In the manufacture of abrasive teeth for stone saws having metal sockets with grooved lateral supporting surfaces which diverge from the opening of the socket for the reception of the enlarged root of the tooth and also having a wedge for pressing the tooth against said lateral supporting surfaces, the steps which comprise preforming a metal sheath adapted to fit in said grooves and to form edge surfaces of the root of the finished tooth, placing said sheath in the tooth mold in contact with the corresponding root-forming surfaces of the mold, filling up the mold with a hardenable abrasive mix, and pressing and curing the abrasive mix in intimate contact with the preformed metal edges, whereby said metal edges present a surface continuous with the remaining surface of the abrasive tooth.

5. The steps in the method of manufacturing an abrasive tooth having a body of bonded abrasive and having metal-lined bevel edges that are adapted to engage two outwardly converging grooves in a saw blade and to engage a groove on an intermediate clamping wedge, which steps comprise forming out of thin sheet metal a single lining strip having V-shaped channels that are more widely spread than the complementary grooves in the saw blade or wedge, placing said metal strip in position on the base of a tooth mold with the extending edges separated by slits, confining said extending edges by means of a supplementary die, placing a mixture of abrasive grain and hardenable bond on the base of the mold, completing the mold and pressing the mix and its metal lining into shape, and curing the bond to unite the abrasive grain along with the bond and the metal lining into an integral tooth.

6. The process of making an abrasive tooth having a root with a plurality of V-shaped edges and adapted to be clamped in corresponding grooves in a socket in a saw blade, which process comprises taking a lower die with a mold cavity having the shape of one of the halves of the tooth that lie on either side of a medial plane passing through the sharp edges of the root of the tooth and said die having an overflow chamber extending around the major portion of the tooth cavity closely adjacent thereto, taking an upper die which is similar in form to the lower die except that it is formed in two parts including a main upper die and a supplemental die, said supplemental die overlying the inclined surfaces which form the edges of the root of the tooth, placing a preformed strip of thin metal in position to form the socket-engaging edges of the tooth, placing the supplemental die over the preformed strip and lower die, surrounding the lower die with a mold barrel, adding a mixture of abrasive grain and a hardenable bond to the mold cavity in amount at least sufficient to form the abrasive tooth, placing the main upper die over the mixture, compressing the mix between the dies and expelling excess mix into the overflow cavity, and curing the molded tooth in intimate contact with the preformed strip.

7. The process of abrasive tooth manufacture described in claim 6 in which the preformed strip is provided with a plurality of extending flaps that are engaged by the supplemental die in the mold and which constitute part of the socket-engaging edges in the finished abrasive tooth, said flaps making in their original form a greater angle with the adjacent inclined surfaces of the metal strip so that pressure from the supplemental die is required to force the flaps downwardly into their final position.

GEORGE W. CHORMANN.
HARRY J. COWIE.